(12) United States Patent
Kim et al.

(10) Patent No.: US 11,687,963 B2
(45) Date of Patent: Jun. 27, 2023

(54) ELECTRONIC APPARATUS AND OPERATION METHOD THEREOF

(71) Applicant: Coupang Corp., Seoul (KR)

(72) Inventors: Seok Hyun Kim, Seoul (KR); Amit Grover, Seoul (KR)

(73) Assignee: Coupang Corp., Seoul (KR)

( * ) Notice: Subject to any disclaimer, the term of this patent is extended or adjusted under 35 U.S.C. 154(b) by 17 days.

(21) Appl. No.: 17/149,559

(22) Filed: Jan. 14, 2021

(65) Prior Publication Data
US 2022/0092625 A1 Mar. 24, 2022

(30) Foreign Application Priority Data
Sep. 18, 2020 (KR) ........................ 10-2020-0120792

(51) Int. Cl.
| | | |
|---|---|---|
| *G06Q 30/00* | (2023.01) | |
| *G06Q 30/0207* | (2023.01) | |
| *G06N 20/00* | (2019.01) | |
| *G06Q 30/0235* | (2023.01) | |
| *G06Q 30/0601* | (2023.01) | |

(52) U.S. Cl.
CPC ......... *G06Q 30/0222* (2013.01); *G06N 20/00* (2019.01); *G06Q 30/0235* (2013.01); *G06Q 30/0633* (2013.01)

(58) Field of Classification Search
CPC ........... G06Q 30/0222; G06Q 30/0235; G06Q 30/0633; G06N 20/00
See application file for complete search history.

(56) References Cited

U.S. PATENT DOCUMENTS

| | | | |
|---|---|---|---|
| 2002/0143612 A1 | 10/2002 | Barik et al. | |
| 2012/0130789 A1* | 5/2012 | Postrel | G06Q 30/0601 |
| | | | 705/14.23 |
| 2012/0284152 A1 | 11/2012 | Hashiyama | |
| 2014/0180782 A1* | 6/2014 | Argue | G06Q 30/0605 |
| | | | 705/14.16 |
| 2015/0371255 A1 | 12/2015 | Rebikov et al. | |

(Continued)

FOREIGN PATENT DOCUMENTS

| | | |
|---|---|---|
| CN | 102844779 A | 12/2012 |
| CN | 106530017 A | 3/2017 |

(Continued)

OTHER PUBLICATIONS

X. Ouyang, P. Garraghan, D. McKee, P. Townend and J. Xu, "Straggler Detection in Parallel Computing Systems through Dynamic Threshold Calculation," 2016 IEEE 30th International Conference on Advanced Information Networking and Applications (AINA), 2016, pp. 414-421, doi: 10.1109/AINA.2016.84. (Year: 2016).*

(Continued)

*Primary Examiner* — Sun M Li
(74) *Attorney, Agent, or Firm* — Knobbe, Martens, Olson & Bear, LLP

(57) ABSTRACT

Provided is a method and an electronic apparatus for providing information regarding a discount coupon to be applied to an item, which a user wishes to purchase in an online store, using an algorithm selected based on at least one of a number of items, a number of discount coupons, and a sum of the number of the items and the number of discount coupons.

12 Claims, 11 Drawing Sheets

(a) Given n items of different weights and bins each of capacity c, assign each item to a bin such that number of total used bins is minimized. It may be assumed that all items have weights smaller than bin capacity.

(b) Number of weights: Number of items to be purchased in online store
Value of weight: Amount to be discounted for item
Number of bins: Number of available discount coupons
Capacity of each bin: Maximum amount to be discounted using each of the discount coupons (c) Example 1
```
Input : weight [ ]    = { 4, 8, 1, 4, 2, 1 }
        Bin Capacity c = 10
Output : 2
We need minimum 2 bins : { 4, 4, 1, 1 }, { 8, 2 }
```

Example 2
```
Input : weight [ ]    = { 9, 8, 2, 2, 5, 4 }
        Bin Capacity c = 10
Output : 4
We need minimum 4 bins : { 9 }, { 8, 2 }, { 2, 5 } { 4 }
```

Example 3
```
Input : weight [ ]    = { 2, 5, 4, 7, 1, 3, 8 }
        Bin Capacity c = 10
Output : 3
We need minimum 3 bins : { 5, 4, 1 }, { 7, 3 }, { 2, 8 }
```

(56) References Cited

U.S. PATENT DOCUMENTS

| | | | | |
|---|---|---|---|---|
| 2016/0171519 A1* | 6/2016 | Kwak | ............... | G06Q 30/0222 705/14.23 |
| 2017/0148046 A1* | 5/2017 | Akbarpour Mashadi | ................... | G06Q 30/0239 |
| 2017/0200164 A1 | 7/2017 | Choi et al. | | |
| 2017/0316448 A1* | 11/2017 | Montero | ............ | G06Q 30/0201 |
| 2019/0005552 A1* | 1/2019 | Moniz | ............... | G06Q 30/0273 |
| 2021/0248638 A1* | 8/2021 | Buckholdt | ......... | G06Q 30/0238 |

FOREIGN PATENT DOCUMENTS

| | | |
|---|---|---|
| CN | 107180371 A | 9/2017 |
| CN | 107886356 A | 4/2018 |
| JP | 2006-023864 A | 1/2006 |
| JP | 2015-052885 A | 3/2015 |
| JP | 2015-072526 A | 4/2015 |
| KR | 10-2013-0129494 A | 11/2013 |
| KR | 10-2016-0071839 A | 6/2016 |
| KR | 10-1687702 B1 | 12/2016 |
| KR | 10-2017-0005618 A | 1/2017 |
| KR | 10-2017-0083330 A | 7/2017 |
| KR | 10-2020-0084640 A | 7/2020 |

OTHER PUBLICATIONS

M. Gaeta, V. Loia, F. Orciuoli and M. Parmentola, "A genetic approach to plan shopping in the Aml-based Blended Commerce," 2013 IEEE International Symposium on Industrial Electronics, 2013, pp. 1-6, doi: 10.1109/ISIE.2013.6563733. (Year: 2013).*

S. Shakkottai, L. Ying and S. Sah, "Implicit learning for explicit discount targeting in Online Social networks," 49th IEEE Conference on Decision and Control (CDC), Atlanta, GA, USA, 2010, pp. 647-654, doi: 10.1109/CDC.2010.5717034. (Year: 2010).*

Jacek Błazewicź*,*, Mikhail Y. Kovalyov, Jedrzej ֻ Musiał*, Andrzej P. Urbanski '*, Adam Wojciechowski Internet Shopping Optimization Problem, Int. J. Appl. Math. Comput. Sci., 2010, vol. 20, No. 2, 385-390 DOI: 10.2478/v10006-010-0028-0 (Year: 2010).*

* cited by examiner

FIG. 2

🛒 Shopping cart

| ☑ Select all | Product information | | Product price | Shipping fee |
|---|---|---|---|---|
| ☑ | Fabric softener, 1.05L, 3 units | | 13,750won | |
| | 13,750won [1 ▼] | | | Free |
| ☑ | Mineral water, 2L, 12 units | | 15,980won | |
| | 7,990won [2 ▼] | | | |

Product price 9,730won ⊕ Free shipping fee ⊖ Order total 29,730won

☑ Select all (2/2)

Apply discount coupon

◉ 15,000won  Discount for first purchase of new member (23 hours left) up to 15,000 won
             to be discounted on purchase for 20,000 won or more    Target to apply ⑦
◉ 5,000won   5,000 won discount coupon (9 days 1 hour left) allowed to use on purchase
             of household supplies for 20,000 won or more           Target to apply ⑦
○ Don't apply discount coupon

(a) Given n items of different weights and bins each of capacity c, assign each item to a bin such that number of total used bins is minimized. It may be assumed that all items have weights smaller than bin capacity.

(b) Number of weights: Number of items to be purchased in online store
Value of weight: Amount to be discounted for item
Number of bins: Number of available discount coupons
Capacity of each bin: Maximum amount to be discounted using each of the discount coupons (c) Example 1

```
Input :   weight [ ]       = { 4, 8, 1, 4, 2, 1 }
          Bin Capacity c   = 10
Output : 2
We need minimum 2 bins : { 4, 4, 1, 1 }, { 8, 2 }
```

Example 2

```
Input :   weight [ ]       = { 9, 8, 2, 2, 5, 4 }
          Bin Capacity c   = 10
Output : 4
We need minimum 4 bins : { 9 }, { 8, 2 }, { 2, 5 } { 4 }
```

Example 3

```
Input :   weight [ ]       = { 2, 5, 4, 7, 1, 3, 8 }
          Bin Capacity c   = 10
Output : 3
We need minimum 3 bins : { 5, 4, 1 }, { 7, 3 }, { 2, 8 }
```

| Coupon ID | Type | Discount rate/ Maximum discount amount | Target item | Remarks |
|---|---|---|---|---|
| D1 | Flat amount discount | 1200 won | $I_1, I_2, I_3$ | Price of each item: : 10000won |
| D2 | Flat rate discount | 10 % (5000 won to be discounted at maximum) | $I_1, I_2, I_3$ | |

(b)

| Coupon ID | Target item | Discount amount | |
|---|---|---|---|
| D1 | $I_1$ | 1200 won | Total 3200won |
| D2 | $I_2, I_3$ | 2000 won | |

(c)

| Coupon ID | Target item | Discount amount | |
|---|---|---|---|
| D1 | - | - | Total 3000won |
| D2 | $I_1, I_2, I_3$ | 3000 won | |

FIG. 9
(a)
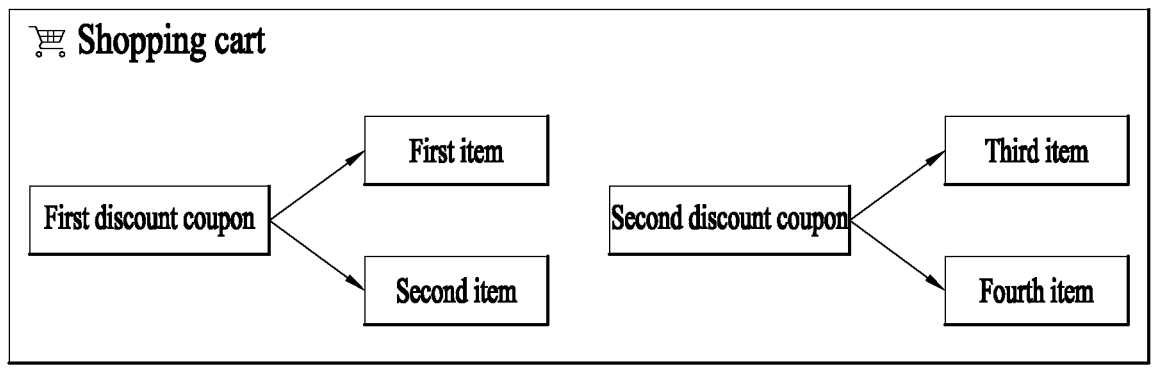
(b)
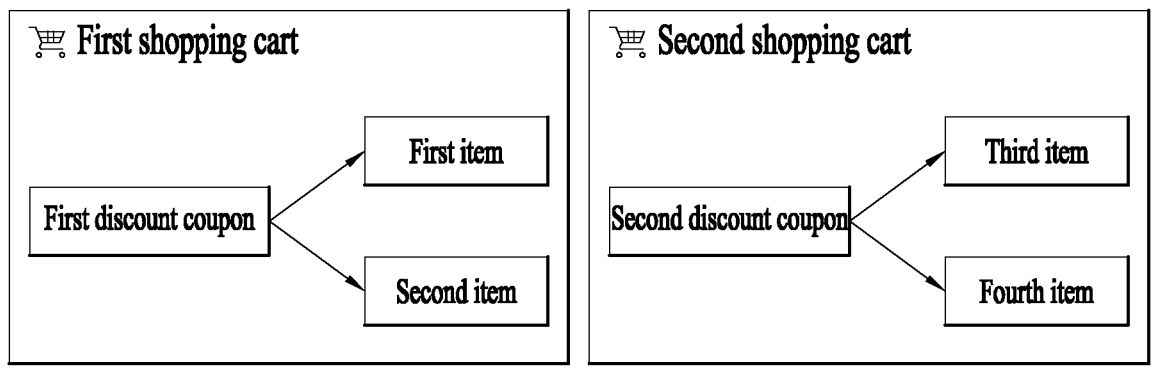

ELECTRONIC APPARATUS AND OPERATION METHOD THEREOF

BACKGROUND

Technical Field

The present disclosure relates to an electronic apparatus for providing information regarding a discount coupon applicable to an item on purchase of the item by a user in an online store, and an operation method of the apparatus.

Description of the Related Art

A user can download a discount coupon from an online store and purchase an item at a discounted price using the discount coupon. However, discount coupons may be classified into a flat amount discount coupon offering a certain discount amount, a flat rate discount coupon offering a certain discount rate, etc. by discount type, and even if the same discount coupon is used, a final discount amount may be different depending on a combination of items to which the discount coupon applies.

Accordingly, when a user directly determines a discount coupon to be applied to each item, it may harm the user's convenience and a discount service provided by the online store may not be properly utilized. Accordingly, there is a need for a service that provides an online store user with information regarding a discount coupon applicable to each item.

SUMMARY

Technical Goals

An aspect provides an electronic apparatus and an operation method thereof. Technical goals to be achieved through the example embodiments are not limited to the technical goals as described above, and other technical tasks can be inferred from the following example embodiments.

Technical Solutions

According to a first embodiment, there is provided a method for providing information on or regarding a discount coupon to be applied to an item, the method including selecting one of a plurality of algorithm as a first algorithm based on at least one of: a number of items, a number of discount coupons, and a sum of the number of items and the number of discount coupons, determining, using the first algorithm, a set of each of the discount coupons and an item subject to each of the discount coupons, and providing a user with discount coupon-associated information based on information regarding the set of each of the discount coupons and the item subject to each of the discount coupons.

According to a second embodiment, there is provided an electronic apparatus for providing information on a discount coupon to be applied to an item, the apparatus including a memory configured to store at least one instruction, and a processor configured to execute the at least one instruction to select one of a plurality of algorithm as a first algorithm based on at least one of: a number of items, a number of discount coupons, and a sum of the number of items and the number of discount coupons, determine, using the first algorithm, a set of each of the discount coupons and items subject to each of the discount coupons, and provide a user with discount coupon-associated information based on information regarding the set of each of the discount coupons and the item subject to each of the discount coupons.

According to a third embodiment, there is provided a non-transitory recording medium having recorded thereon a program, which, when executed by a computer, implements the above-described method.

Specific details of example embodiments are included in the detailed description and drawings.

Effects

The electronic apparatus according to the present disclosure provides discount coupon-associated information to a user wishing to purchase a plurality of items and having a plurality of discount coupons in an online store, so that the user can use the discount coupons efficiently, thereby improving user convenience.

In addition, compared to the case in which an optimal algorithm is used to provide information regarding a discount coupon applicable to an item, the electronic apparatus according to the present disclosure efficiently determines a set of a discount coupon and an item subject to the discount coupon more within a shorter period of time and provides a user with information regarding the discount coupon, thereby improving convenience of the user who wishes to purchase the item.

In addition, the electronic apparatus according to the present disclosure has an effect of providing a consistent recommendation to a user who wishes to purchase the same item using the same discount coupon.

Effects are not limited to the aforementioned effects, and other effects not mentioned will be clearly understood by those skilled in the art from the description of the claims.

BRIEF DESCRIPTION OF THE DRAWINGS

FIG. 2 is a diagram illustrating a shopping cart page provided when purchasing an item in an online store.

FIG. 3 is a diagram for explaining a case of using a conventional bin packing algorithm to provide discount coupon-associated information.

FIG. 4 is a diagram for explaining attribute information of a discount coupon.

FIG. 9 is a diagram for explaining an embodiment of dividing a plurality of items and discount coupons included in one shopping cart into a plurality of shopping carts.

DETAILED DESCRIPTION

Terms used in embodiments are selected among common terms that are currently widely used in consideration of their functions in the present disclosure, but the terms may be different according to an intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the specification, when a part is said to "include" a certain component, which means that it may further include other components, except to exclude other components unless otherwise stated. In addition, terms such as " . . . unit", " . . . module", or the like refer to units that perform at least one function or operation, and the units may be implemented as hardware or software or as a combination of hardware and software.

Throughout the specification, the expression "at least one of A, B, and C" may include the following meanings: A alone; B alone; C alone; both A and B together; both A and C together; both B and C together; and all three of A, B, and C together.

"Set of a discount coupon and an item subject to the discount coupon" and "combination of a discount coupon and an item" described throughout the specification refer to the same meaning that is, a set including a discount coupon and a target item to which the discount coupon applies.

The term "terminal" mentioned below may be implemented as a computer or mobile terminal capable of accessing a server or another terminal over a network. Here, the computer includes, for example, a laptop equipped with a web browser, a desktop, a laptop, and the like, and the mobile terminal is, for example, wireless communication device assuring portability and mobility and may include any type of handheld-based wireless communication devices like communication-based terminals, which is based on International Mobile Telecommunication (IMT), Code Division Multiple Access (CDMA), W-Code Division Multiple Access (W-CDMA), Long Term Evolution (LTE), smart phones, tablet PCs, and the like.

Hereinafter, embodiments of the present disclosure will be described in detail with reference to the accompanying drawings so that those skilled in the art can easily implement the present disclosure. However, the present disclosure may be implemented in various different forms but it is not limited to the exemplary embodiments described hereinafter.

Hereinafter, embodiments of the present disclosure will be described in detail with reference to the drawings.

Figure 1:
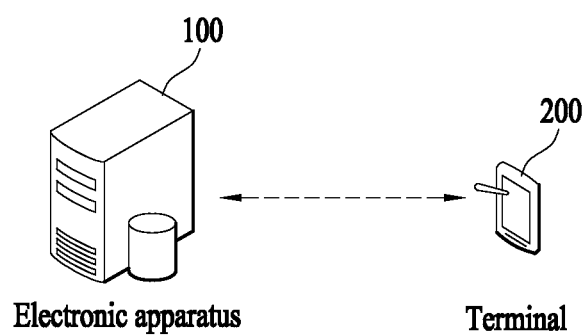
FIG. 1 shows an online store system according to an embodiment.

FIG. 1 shows an online store system according to an embodiment.

Referring to FIG. 1, an online store system 1 may include an electronic apparatus 100 and a terminal 200. The system 1 illustrated in FIG. 1 shows only the components related to this embodiment are shown. Accordingly, it would be understood by one of ordinary skill in the art that general-purpose components other than the components shown in FIG. 1 may be further included.

The electronic apparatus 100 and the terminal 200 may communicate with each other within a network. The network may include a Local Area Network (LAN), a Wide Area Network (WAN), a Value Added Network (VAN), a mobile radio communication network, a satellite communication network, and a combination thereof, and the network is, in a broad sense, a data network via which components of each network actively communicate with each other and may include wired Internet, wireless Internet, and a mobile wireless communication network. Wireless communication may include, for example, but not limited to, wireless LAN (Wi-Fi), Bluetooth, Bluetooth low energy (Bluetooth low energy), Zigbee, WFD (Wi-Fi Direct), UWB (ultra wideband), infrared communication (IrDA, infrared data association)), NFC (Near Field Communication), and the like.

The electronic apparatus 100 may operate the online store system. Specifically, when a user accesses an online store using the terminal 200, the electronic apparatus 100 may display items available in the online store, and may proceed to purchase items selected by the user. Also, the electronic apparatus 100 may provide the user with a discount coupon. Accordingly, the user may download the discount coupon and use the discount coupon when purchasing the items.

When the user of the terminal 200 wishes to purchase an item in the online store, the electronic apparatus 100 may provide information regarding a specific discount coupon among available discount coupons. In addition, it is possible to recommend the use of the specific discount coupon. For example, when there are a plurality of items that the user wishes to purchase and a plurality of discount coupons downloaded, information regarding a combination of each item and each of the discount coupons with a maximum discount benefit may be provided to the user.

An algorithm that can be used by the electronic apparatus 100 to provide the information regarding the specific discount coupon may be at least one of a heuristic algorithm and an optimal algorithm. The electronic apparatus 100 according to an embodiment may select one of the heuristic algorithm and the optimal algorithm based on at least one of: a number of items, a number of discount coupons; and a sum of the number of items and the number of discount coupons, determine a set of each of the discount coupons and an item subject to a corresponding discount coupon using the selected algorithm, and provide the user with discount coupon-associated information. In this case, the discount coupon-associated information provided to the user may include, but not limited to, final price information, information regarding matching of the items and the coupons, and the like.

The optimal algorithm may determine a combination of an item and a discount coupon with a maximum discount rate, among every combination of the corresponding item and any discount coupon that can be used when purchasing the corresponding item. According to the information regarding a set, determined by the optimal algorithm, of a discount coupons and an item subject to the discount coupon, a maximum discount amount may be provided when the item is purchased; however, it may take a long delay time to calculate a result due to high computational complexity of the optimal algorithm.

Meanwhile, the heuristic algorithm determines, based on a greedy approach, sets of a discount coupon and an item subject to the discount coupon, and thus, it is hardly considered that the heuristic algorithm always calculates a result providing a maximum discount amount. However, the heuristic algorithm has lower computational complexity than that of the optimal algorithm, and thus, the heuristic algorithm may provide discount coupon-associated information with a short delay time compared to the optimal algorithm.

The electronic apparatus 100 may provide a platform for the online store. Specifically, the electronic apparatus 100 may provide an application for using the online store to the terminal 200, and the electronic apparatus 100 may execute the application to purchase an item. For example, the electronic apparatus 100 may be included in a server operating the online store.

FIG. 2 is a diagram illustrating a shopping cart page provided when purchasing an item in an online store.

An online store according to an embodiment may provide a shopping cart function, and a user may add a desired item to a shopping cart. In addition, a user may download a discount coupon available in the online store, and the downloaded discount coupon may be checked on the shopping cart page.

Meanwhile, discount coupons may include a flat amount discount coupon offering a predetermined discount amount and a flat rate discount coupon offering a predetermined discount rate. In addition, the discount coupons may be applied to different items and may offer different discount amounts according to attributes, such as a discount coupon given only for a new member, a discount coupon to be used on purchase of items in specific categories, etc.

Referring to FIG. 2, a user may select some of discount coupons 210 displayed on a shopping cart page and purchase an item at a discounted price. However, if the user directly selects a discount coupon when there is a plurality of discount coupons, the discount rate and user convenience may be deteriorated.

Meanwhile, discount coupon-associated information provided by the electronic apparatus 100 may be displayed on the shopping cart page illustrated in FIG. 2 or on the final payment page, but the page showing the discount coupon-associated information is limited thereto. In addition, the aforementioned "shopping cart" may be understood as an object including a group of items selected by a user and a group of available discount coupons.

FIG. 3 is a diagram for explaining a case of using a conventional bin packing algorithm to provide discount coupon-associated information.

Meanwhile, a problem may arise if the conventional bin packing algorithm is used to determine a set of each of the discount coupons and an item subject to a corresponding discount coupon. Here, the bin packing algorithm may refer to an algorithm that calculates a minimum number of bins capable of containing n items each having a different weight, assuming that there is a plurality of usable bins each having a capacity C.

Referring to (a) and (b) of FIG. 3, when the bin packing algorithm is used as an algorithm for determining a set of each of the discount coupons and an item subject to a corresponding discount coupon, the number of weights may correspond to items desired by a user to purchase in an online store and each weight value may correspond to an amount to be discounted for each item. In addition, a plurality of available bins may correspond to discount coupons, and the capacity of each bin may correspond to a maximum amount to be discounted using each of the discount coupons.

(c) of FIG. 3 is a diagram for explaining a method of determining a set of each of the discount coupons and an item subject to a corresponding discount coupon using a bin packing algorithm.

Referring to Example 1 in (c) of FIG. 3, assuming that the amount to be discounted for six items the user wishes to purchase is {4, 8, 1, 4, 2, 1} and that a maximum amount to be discounted using each of the discount coupons is 10 per discount coupon, if the bin packing algorithm is used, it may be determined to use two discount coupons in total. Specifically, it may be determined to get a discount on 4 items with an amount {4, 4, 1, 1} to be discounted using one discount coupon and get a discount on two items with an amount {8, 2} to be discounted using a different discount coupon.

Referring to Example 2 in (c) of FIG. 3, assuming that the amount to be discounted for six items desired by a user to purchase is {9, 8, 2, 2, 5, 4} and that a maximum amount to be discounted using a discount coupon is 10 per discount coupon, if the bin packing algorithm is used, it may be determined to use four discount coupons in total. Specifically, combinations of items to be discounted using four discount coupons may be {9}, {8, 2}, {2, 5} and {4}, respectively.

Referring to Example 3 in (c) of FIG. 3, assuming that the amount to be discounted for 7 items desired by a user to purchase is {2, 5, 4, 7, 1, 3, 8} and that a maximum amount to be discounted using a discount coupon is 10 per discount coupon, if the bin packing algorithm is used, it may be determined to use a total of three discount coupons. Specifically, combinations of items to be discounted using three discount coupons may be {5, 4, 1}, {7, 3}, and {2, 8}, respectively.

As shown in (c) of FIG. 3, the bin packing algorithm may efficiently determine a set of each of the discount coupons and an item subject to a corresponding discount coupon, but it is assumed that all discount coupons are flat rate discount coupons. In other words, if available discount coupons include a flat rate discount coupon, it is difficult to determine an optimal combination of an item and a discount coupon using the bin packing algorithm.

A method of determining an optimal combination of an item and a discount coupon when both a flat rate discount coupon and a flat amount discount coupon can be used will be described with reference to FIG. 4.

FIG. 4 is a diagram for explaining attribute information of a discount coupon.

A discount coupon that can be used in an online store may be a flat amount discount coupon or a flat rate discount coupon. Here, the flat amount discount coupon refers to a coupon that offers a certain amount of discount regardless of a price and a quantity of a corresponding item using the coupon when a certain condition is satisfied, and the flat rate discount coupon is a coupon that offers a discount according to a certain discount rate. When an online store provides a flat rate discount coupon or a discount coupon each having a different attribute, it may be difficult to determine an optimal combination of an item and a discount coupon using the above-described blank packing algorithm.

For example, attribute information of a discount coupon may include a discount type, a discount rate, or a maximum discount amount. If attribute information of discount coupons D1 and D2 of two types is the same as (a) of FIG. 4, and three items I1 to I3 each having a price of 10000 won are included in a shopping cart, optimal combinations of the items and the discount coupons may be as shown in (b) of FIG. 4. In other words, when a first item I1 is purchased by applying the first discount coupon D1, and the second and third items I2 and I3 are purchased by applying the second discount coupon D2, a user may be benefited with a maximum discount of 3200 won.

However, when combinations of the items and the discount coupons are determined using the bin packing algorithm, the determination result is as shown in (c) of FIG. 4. Specifically, since a maximum discount amount of the second discount coupon D2 is 5,000 won, it may be determined that the second discount coupon D2 should be applied to all the items I1 to I3 when the bin packing algorithm is used. However, this is an amount less than the discount amount of 3200 won in (b) of FIG. 4, and thus it is not considered an optimal combination.

As described above, when a flat rate discount coupon is included, it may be difficult to determine an optimal combination of an item and a discount coupon using the conventional bin packing algorithm. Therefore, it is necessary to determine a combination of an item and a discount coupon with a maximum discount amount based on attribute information of the discount coupon.

Meanwhile, it is apparent to those skilled in the art that, in addition to the attribute information of the discount coupons shown in (a) of FIG. 4, information of the discount coupons may consider a user ranking allowed to use the discount coupons and a payment method allowed to use with the discount coupons so as to calculate combinations of items and discount coupons.

Figure 5:
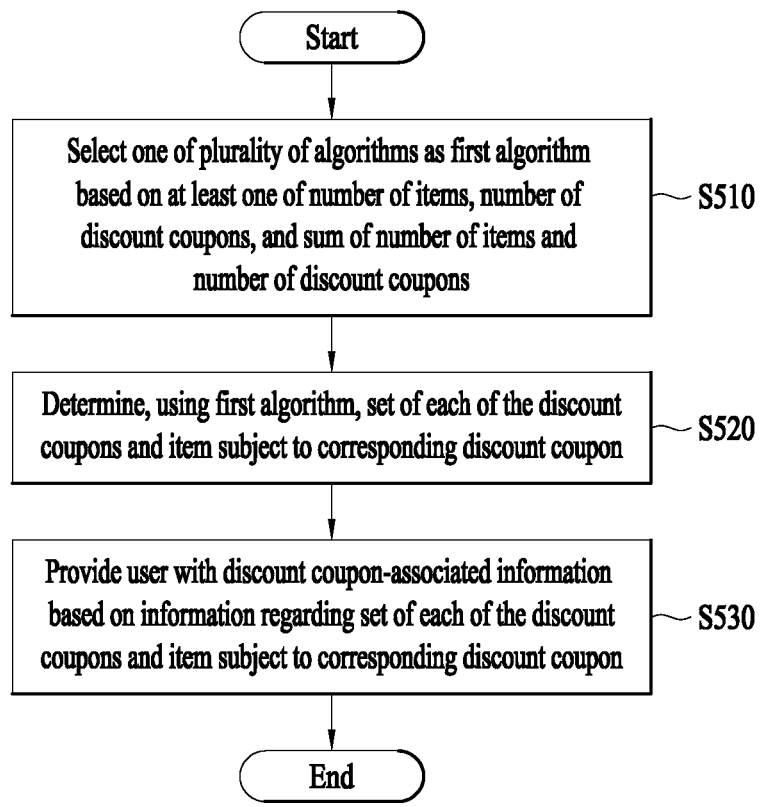
FIG. 5 is a diagram for explaining an embodiment of a method of providing information regarding a discount coupon to be applied to an item by an electronic apparatus.

FIG. 5 is a diagram for explaining an embodiment of a method of providing information regarding a discount coupon to be applied to an item by an electronic apparatus.

In operation S510, an electronic apparatus 100 may select one of a plurality of algorithms as a first algorithm based on at least one of: a number of items, a number of discount coupons, and a sum of the number of the items and the number of discount coupons. Here, the plurality of algorithms may include at least one of a heuristic algorithm and an optimal algorithm. For example, in operation S510, the electronic apparatus 100 may select one of the heuristic algorithm and the optimal algorithm as the first algorithm according to whether at least two of the following conditions are satisfied: a first condition associated with the number of items; a second condition associated with the number of discount coupons; and a third condition associated with the sum of the number of the discount coupons and the number of the items.

Meanwhile, the first condition may be whether the number of items included in a shopping cart exceeds a first threshold, and the second condition may be whether the number of discount coupons included in a shopping cart exceeds a second threshold. In addition, the third condition may be whether a sum of the number of items and the number of discount coupons in a shopping cart exceeds a third threshold, and when at least two of the three conditions are satisfied, the heuristic algorithm may be selected as the first algorithm.

Meanwhile, the electronic apparatus 100 according to an embodiment may set the first threshold to 7, the second threshold to 3, and the third threshold to 10, but this is merely an example and it is apparent to those skilled in the art that various numbers can be applied. In addition, a sum of the first threshold and the second threshold is not necessarily the same as the third threshold, and the sum of the first threshold and the second threshold may be a value less or larger than the third threshold.

Here, the heuristic algorithm may be an algorithm that determines priorities of discount coupons based on attribute information of the discount coupons and determines information associated with information regarding a set of each of the discount coupons and an item subject to a corresponding discount coupon, starting with a first discount coupon of a highest priority based on selection of an item which is to be most discounted when the first discount coupon is used. In this case, the attribute information of the discount coupons may include at least one of a discount type, a discount rate, and the maximum discount amount, and the discount type may include one of a flat rate discount type and a flat amount discount type.

In addition, a discount coupon of the flat rate discount type may have a higher priority than that of a discount coupon of the flat amount discount type, a discount coupon with a higher flat discount rate may have a higher priority among discount coupons of the flat rate discount type, and a discount coupon with a larger flat discount amount may have a higher priority among discount coupons of the flat amount discount type.

Meanwhile, the optimal algorithm may be an algorithm that determines a combination of an item and a discount coupon with a maximum discount amount in total with respect to every combination of discount coupons and items. In addition, when there is a plurality of combinations of discount coupons and items, the optimal algorithm may be an algorithm that performs in parallel operations of determining a set of each of the discount coupons and an item subject to a corresponding discount coupon with respect to the plurality of the combinations of discount coupons and items.

In the case where the optimal algorithm is selected as the first algorithm, the method of the present disclosure may further include identifying, using the heuristic algorithm, a discount coupon to be applied to an item when a run time exceeds a first time threshold.

In operation S520, the electronic apparatus 100 may determine a set of each of the discount coupons and an item subject to a corresponding discount coupon using the first algorithm. Here, the set of each of the discount coupons and an item subject to a corresponding discount coupon may be calculated based on at least one of: information on or regarding the item and information on the corresponding discount coupon. In addition, the information on the item may include at least one of: ID of the item, a category to which the item belongs, and a price of the item, and the information on the corresponding discount coupon may include at least one of attribute information of the corresponding discount coupon, an allowed user ranking, and an available payment method.

In operation S530, the electronic apparatus 100 may provide a user with discount coupon-associated information based on information regarding the set of each of the discount coupons and an item subject to a corresponding discount coupon.

The method of the present disclosure according to an embodiment may further include: determining a set having a largest number of elements among the set of each of the discount coupons and an item subject to a corresponding discount coupon as a first set; reselecting the first algorithm based on the number of elements in the first set; and determining a set of each updated discount coupon and an item subject to a corresponding updated discount coupon using the reselected first algorithm and the set of each of the discount coupons and an item subject to a corresponding discount coupon. In this case, item-associated information may be determined based on the set of each updated discount coupon and an item subject to a corresponding updated discount coupon.

If a plurality of algorithms includes at least one of the heuristic algorithm and the optimal algorithm and the heuristic algorithm has been selected as the first algorithm, the reselecting of the first algorithm may be reselecting of the optimal algorithm as the first algorithm when the number of elements in the first set is less than or equal to a fifth threshold. Meanwhile, the fifth threshold of the electronic apparatus 100 according to an embodiment may be the same as the third threshold. In other words, the electronic apparatus 100 may compare the third threshold for a sum of the number of items and the number of discount coupons with the number of elements in the first set. This is based on the fact that even though an actual sum of the number of items and the number of discount coupons exceeds the third threshold, if the number of elements in a set, determined by the heuristic algorithm, of each of the discount coupons and an item subject to a corresponding discount coupon is limited, a delay time does not increase significantly despite use of the optimal algorithm. Accordingly, in this case, the electronic apparatus 100 may determine a set of each of the discount coupons and an item subject to a corresponding discount coupon using the optimal algorithm.

In addition, in a case where only one discount coupon is used for one shopping cart and items and discount coupons are included in a first shopping cart, the method of the present disclosure may further include classifying, based on information regarding a set of each of the discount coupons and an item subject to a corresponding discount coupon, items recommended for use of the same discount coupon; and dividing, based on the classification, the first shopping cart into a plurality of shopping carts. Accordingly, even when a plurality of items and a plurality of discount coupons are included in one shopping cart, the electronic apparatus 100 may provide a user with combinations of the items and the discount coupons with a maximum discount benefit and discount coupon-associated information.

In the electronic apparatus 100 according to an embodiment, the discount coupon-associated information may be displayed on at least one of a shopping cart page and a final payment page in the online store.

Meanwhile, the electronic apparatus 100 according to an embodiment may store information on a set of each of the discount coupons and an item subject to a corresponding discount coupon and the discount coupon-associated information. In addition, when it is necessary to provide later information regarding one discount coupon and a set of items to which the same discount coupon is applied, the electronic apparatus 100 may provide pre-stored information. In this case, the electronic apparatus 100 may reduce a delay time taken to determine a discount coupon and a set of items to which the discount coupon is applied.

In addition, the electronic apparatus 100 according to an embodiment may use a pruning approach to determine a discount coupon and a set of items to which the discount coupon is applied. For example, in an embodiment, any one discount coupon among a plurality of discount coupons may not affect a total discount amount even if the coupon is used. In this case, the electronic apparatus 100 may stop calculating a combination including the corresponding discount coupon and an item.

Figure 6:
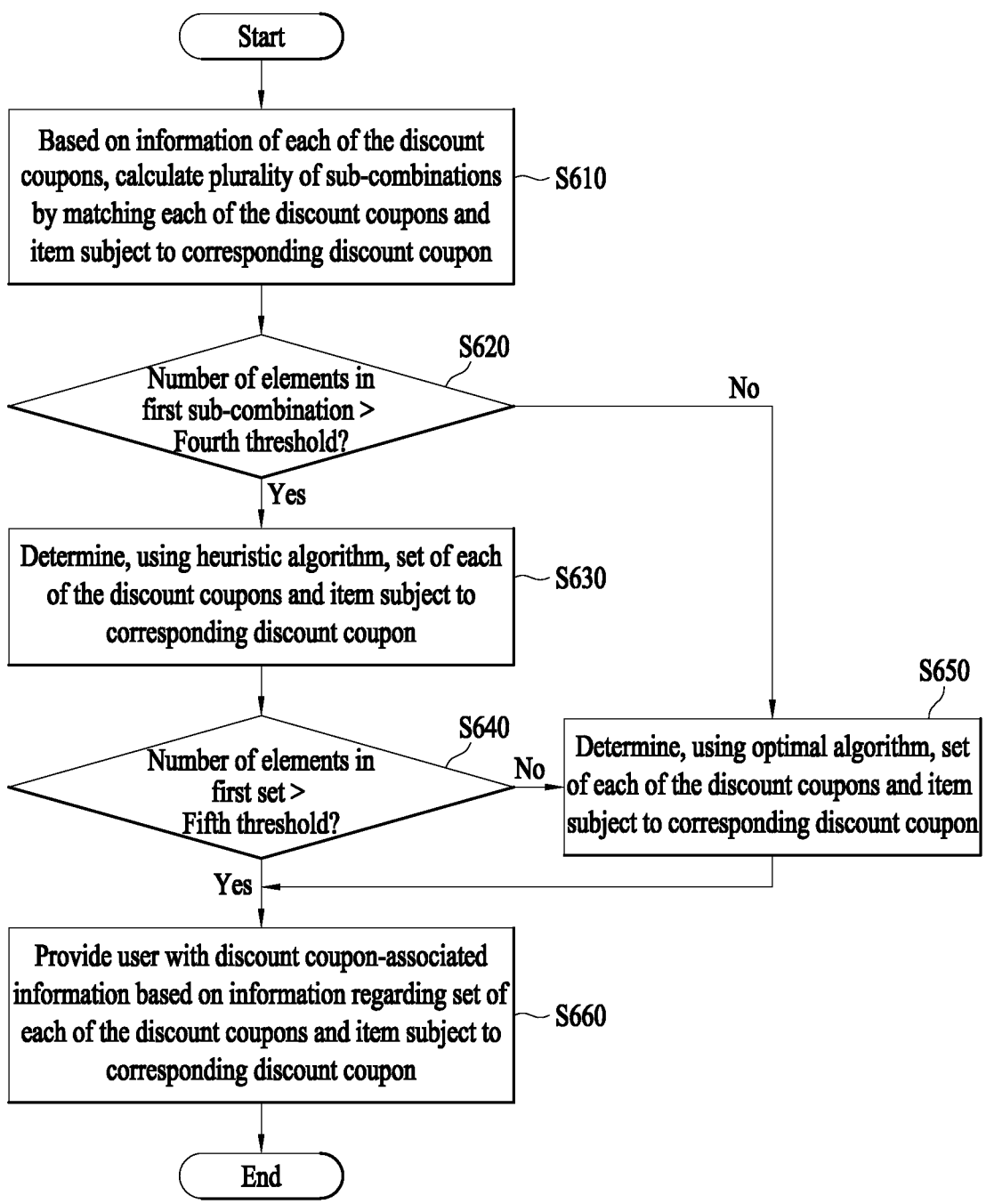
FIG. 6 is a diagram for explaining another embodiment of a method of providing information regarding a discount coupon applicable to an item by an electronic apparatus.

FIG. 6 is a diagram for explaining another embodiment of a method of providing information regarding a discount coupon to be applied to an item by an electronic apparatus.

An electronic apparatus 100 according to an embodiment may select a first algorithm based on sub-combinations obtained by matching each of the discount coupons and an item subject to a corresponding discount coupon. In this case, a probability of the optimal algorithm to be selected may increase, compared to the case of selecting the first algorithm based on the total number of items and discount coupons. Accordingly, there may be many cases where a user is provided with information regarding an optimal combination of an item and a discount coupon.

In operation S610, the electronic apparatus 100 may calculate, based on the information regarding each of the discount coupons, a plurality of sub-combinations by matching each of the discount coupons and an item subject to a corresponding discount coupon. In this case, the electronic apparatus 100 may determine a sub-combination having a largest number of elements among the plurality of sub-combinations as a first sub-combination.

In operation S620, the electronic apparatus 100 may determine whether the number of elements in the first sub-combination exceeds a fourth threshold. If the number of elements in the first sub-combination exceeds the fourth threshold, operation S630 may be performed; if not, operation S650 may be performed. Meanwhile, the fourth threshold may be a value identical to the third threshold, but the two thresholds are not limited thereto.

In operation S630, the electronic apparatus 100 may use a heuristic algorithm to determine a set of each of the discount coupons and an item subject to a corresponding discount coupon. Meanwhile, a procedure of performing the heuristic algorithm will be described with reference to FIG. 7.

In operation S650, using the optimal algorithm, the electronic apparatus 100 may determine a set of a discount coupon and an item subject to the discount coupon, the set capable of providing a maximum discount benefit. Meanwhile, a procedure of performing the optimal algorithm will be described with reference to FIG. 8.

Although not shown in FIG. 6, when a run time of operation S650 exceeds a first time threshold, the electronic apparatus 100 may identify, using the heuristic algorithm, a discount coupon to be applied to an item. In other words, when a run time of the optimal algorithm exceeds a predetermined time, the electronic apparatus 100 may use the heuristic algorithm rather than the optimal algorithm to identify a discount coupon to be applied to an item, and accordingly, it is possible to reduce a delay time compared to the method employing only the optimal algorithm. The electronic apparatus 100 according to an embodiment may set the first time threshold to two seconds, but this is merely an example, and it is apparent to those of ordinary skill in the art that various times may be applied as the first time threshold.

In operation S640, the electronic apparatus 100 may determine a set having a largest number of elements among the set, determined in operation S630, of each of the discount coupons and an item subject to a corresponding discount coupon as a first set, and may determine whether the number of elements in the first set exceeds a fifth threshold. If the number of elements in the first set exceeds the fifth threshold, the electronic apparatus 100 may perform operation S660; if not, the electronic apparatus 100 may perform operation S650. Meanwhile, the fifth threshold according to an embodiment may be a value identical to the third threshold, but the two thresholds are not limited thereto.

In the case of performing the above-described operations, even though the heuristic algorithm is selected as the first algorithm, if a set, determined by the heuristic algorithm, of a discount coupon and an item subject to the discount coupon has a small number of elements, the electronic apparatus 100 may determine a combination of a discount coupon and an item again using the optimal algorithm. Accordingly, the electronic apparatus 100 according to the present disclosure has an effect of providing the same recommendation result to a plurality of users who apply the same discount coupon to the same items.

In operation S660, the electronic apparatus 100 may provide a user with discount coupon-associated information based on information regarding a set of each of the discount coupons and an item subject to a corresponding discount coupon.

Figure 7:
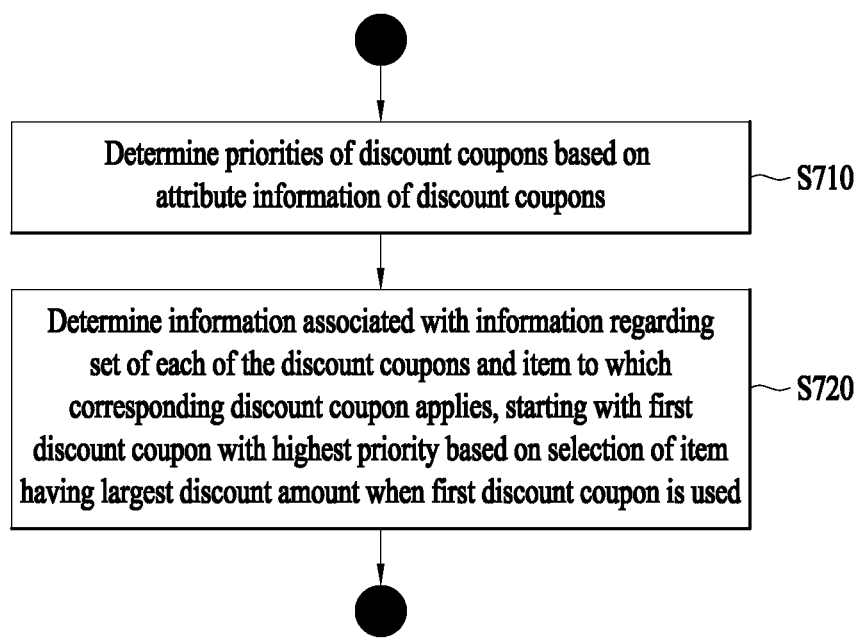
FIG. 7 is a diagram illustrating a procedure of performing a heuristic algorithm according to an embodiment.

FIG. 7 is a diagram illustrating a procedure of performing a heuristic algorithm according to an embodiment.

In operation S710, an electronic apparatus 100 may determine priorities of discount coupons based on attribute information of the discount coupons. Here, the attribute information of each of the discount coupons may include at least one of a discount type, a discount rate, and a maximum discount amount, and the discount type may include one of a flat rate discount type and a flat amount discount type.

For example, a discount coupon of the flat rate discount type may have a higher priority than that of a discount coupon of the flat amount discount type, a discount coupon with a higher discount rate may have a higher priority among discount coupons of the flat rate discount type, and a discount coupon with a higher discount amount may have a higher priority among discount coupons of the flat amount discount type, but a criterion for determining the priorities between discount coupons is not limited thereto.

In operation S720, the electronic apparatus 100 may determine information associated with information regarding a set of each of the discount coupons and an item subject to a corresponding discount coupon, starting with a first discount coupon with a highest priority based on selection of an item which is to be most discounted when the first discount coupon is used. Here, the information associated with the information regarding the set of each of the discount coupons and an item subject to a corresponding discount coupon may include, but not limited to, final price information, information on matching of an item and each of the discount coupons, etc.

Combinations including discount coupons D1 and D2 and items I1 to I3 shown in FIG. 4 may be calculated using the above-described heuristic algorithm. When attribute information of the discount coupons is as shown in (a) of FIG. 4, a priority of a second discount coupon D2 of the flat rate discount type may be higher than a priority of a first discount coupon D1 of the flat amount discount type. Accordingly, the electronic apparatus 100 may first select an item subject to the second discount coupon D2.

Meanwhile, the second discount coupon D2 may be applied to all the three items I1 to I3, but, in order to further use the first discount coupon D1, the electronic apparatus 100 may determine a second item I2 and a third item I3 as items for the second discount coupon D2 and may calculate a combination {D2, I2, I3} thereof. In addition, a combination {D1, I1} of the first discount coupon D1 and the item I1 subject to the first discount coupon D1 may be calculated. Accordingly, even when the heuristic algorithm is used, it is possible to calculate into the same combinations of discount coupons and items as shown in (b) of FIG. 4.

Meanwhile, in the case of the heuristic algorithm according to an embodiment, even if all items included in a shopping cart are items to which a discount coupon with a highest priority is applicable, when a discount coupon with a lower priority is used, a discount amount may further increase. Accordingly, the heuristic algorithm according to an embodiment may determine to use the discount coupon with the lower priority for a number of items less than a number of items to which the discount coupon with the highest priority is applicable.

Figure 8:
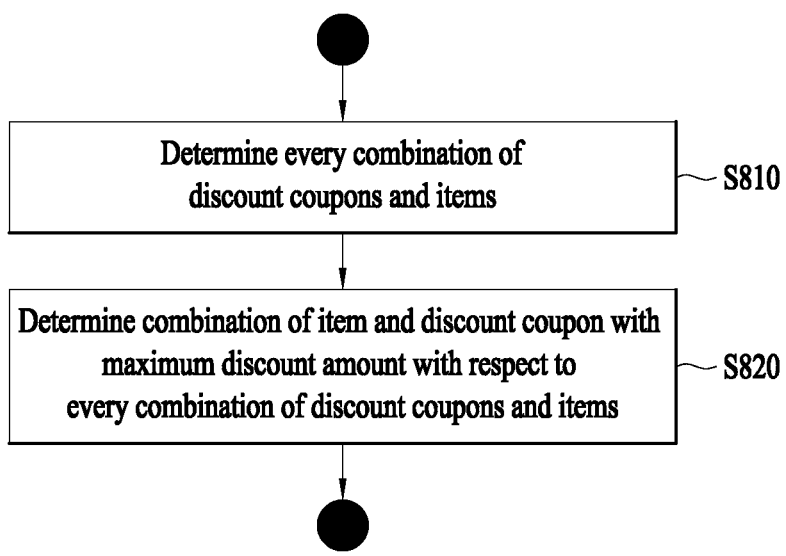
FIG. 8 is a diagram illustrating a procedure of performing an optimal algorithm according to an embodiment.

FIG. 8 is a diagram illustrating a procedure of performing an optimal algorithm according to an embodiment.

In operation S810, an electronic apparatus 100 may determine every combination of discount coupons and items. For example, assuming that items subject to a first discount coupon D1 are a first item I1 to a third item I3 and that items subject to a second discount coupon D2 are the third item I3 to a fifth item I5, all the combinations of the respective discount coupons and the items, generated in operation S810, may be evert combination (that is, eight combinations) of the first item I1 to the third item I3 with respect to the first discount coupon D1 and every combination (that is, eight combinations) of the third item I3 to the fifth Item I5 with respect to the second discount coupon D2.

In operation S820, the electronic apparatus 100 may determine combinations of the items and the discount coupons with a maximum discount amount in total with respect to every combination of the discount coupons and the items.

As described above, in the case of calculating the combinations of the respective discount coupons and the items using an optimal algorithm, it is possible to calculate combinations that offers a maximum discount amount. However, when the optimal algorithm is performed for n items and m discount coupons, computational complexity is $m \times 2^n$, and the computational complexity may increase significantly as the number of items increases. When the computational complexity increases significantly, a delay time for providing a user with a determination also increases, and thus, when the optimal algorithm is performed for more than a predetermined time threshold, combinations of discount coupons and items may be determined using a heuristic algorithm rather than the optimal algorithm and relevant information may be provided to the user.

FIG. 9 is a diagram for explaining an embodiment of dividing a plurality of items in one shopping cart into a plurality of shopping carts.

In the case of an online store according to an exemplary embodiment, the number of discount coupons applicable to items included in one shopping cart may be fixed. For example, even if ten items and three discount coupons are included in one shopping cart, the number of discount coupons that can be used for one payment may be limited to one.

For example, referring to (a) of FIG. 9, two discount coupons (a first discount coupon and a second discount coupon) and four items (a first item to a fourth item) may be included in one shopping cart. In addition, as a result of calculating combinations of discount coupons and items using a heuristic algorithm or an optimal algorithm, applying the first discount coupon to the first and second items and applying the second discount coupon to the third and fourth items may be recommended. In this case, if the number of discount coupons that can be used in one shopping cart is limited to one, a user has no choice but to use only one of the first discount coupon and the second discount coupon.

In order to solve this problem, the electronic apparatus 100 according to the present disclosure may divide the shopping cart according to a combination of each of the discount coupons and an item subject to a corresponding discount coupon. Referring to (b) of FIG. 9, the electronic apparatus 100 may divide the shopping cart by the number of discount coupons and may add items subject to each of the discount coupons in different shopping cart. Accordingly, the electronic apparatus 100 of the present disclosure may provide a user with a method of efficiently using available discount coupons without a limitation to the number of discount coupons applicable to items.

Figure 10:
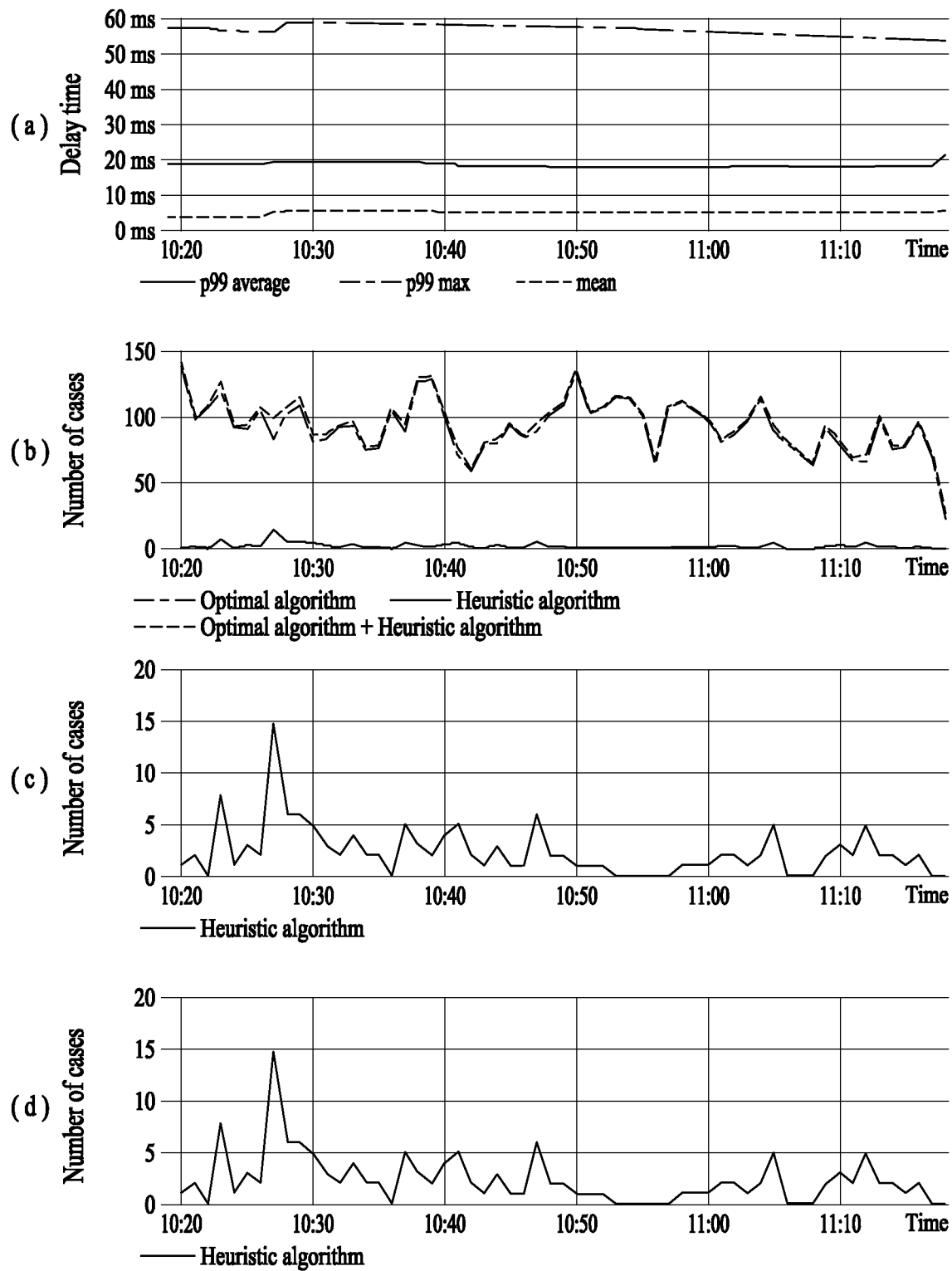
FIG. 10 is a diagram for explaining performance of a method of providing information regarding a discount coupon applicable to an item according to an exemplary embodiment.

FIG. 10 is a diagram for explaining performance of a method of providing information regarding a discount coupon to be applied to an item according to an exemplary embodiment.

(a) in FIG. 10 is a graph for explaining a delay time occurring when an optimal combination of an item and a discount coupon is calculated using an optimal algorithm. In (a) of FIG. 10, "P99 average" denotes an average delay time of 1% of a slowest response and "P99 max" denotes a maximum delay time of 1% of the slowest response. In addition, "mean" denotes an average of the total delay time. Referring to (a) of FIG. 10, when the optimal combination is calculated using the optimal algorithm, it can be seen that the maximum delay time of 1% of the slowest response is about 50 ms to 60 ms.

(b) in FIG. 10 is a graph for explaining the number of combinations of items and discount coupons which are the basis of calculation when each algorithm is used. The "Optimal algorithm" in (b) of FIG. 10 refers to a case where the optimal algorithm is selected or reselected in the method according to the present disclosure, that is, a case where a combination of a discount coupon and an item is calculated using the optimal algorithm, and the "Heuristic algorithm" refers to a case where a combination of a discount coupon and an item is calculated using the heuristic algorithm in the method according to the present disclosure. In addition, the "Optimal algorithm+Heuristic algorithm" is the same as the sum of values of the two indices described above. Referring to (b) of FIG. 10, when the method according to the present disclosure is actually implemented, it can be seen in most cases that a combination of a discount coupon and an item is calculated using the optimal algorithm.

(c) of FIG. 10 is an enlarged graph of the "heuristic algorithm" in (b) of FIG. 10. Referring to (c) of FIG. 10, when the method according to the present disclosure is actually implemented, it can be seen that a combination of a discount coupon and an item is calculated using only the heuristic algorithm.

(d) of FIG. 10 is a graph for explaining a case where only the heuristic algorithm is used because a sum of numbers of items and discount coupons is too large. The graph shown in (d) of FIG. 10 is almost similar to the graph shown in (c) of FIG. 10, and thus, it can be seen that the case of using only the heuristic algorithm is mostly in the case where a sum of the number of items and the number of discount coupons exceeds a predetermined threshold.

Figure 11:
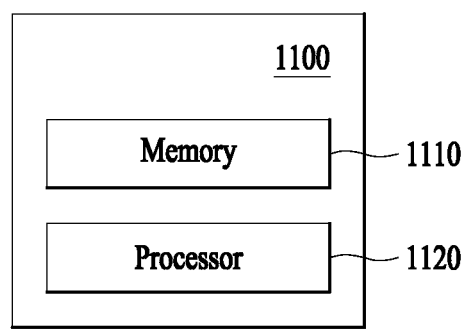
FIG. 11 is a block diagram of an electronic apparatus according to an embodiment.

FIG. 11 is a block diagram of an electronic apparatus according to an embodiment.

An electronic apparatus 1100 may include a memory 1110 and a processor 1120 according to an embodiment. The electronic apparatus 1100 illustrated in FIG. 11 shows only components related to the present embodiment. Accordingly, it would be understood by one of ordinary skill in the art that general-purpose components other than the components shown in FIG. 11 may be further included. Since the description of the electronic apparatuses 1100 is applicable to the description of the electronic apparatus 100, a redundant description will be omitted.

The memory 1110 is hardware storing various types of data processed in the electronic apparatus 1100, and the memory 1110 may store, for example, data processed or to be processed in the electronic apparatus 1110. The memory 1110 may store at least one instruction for operating the processor 1120. In addition, the memory 1110 may store programs or applications to be executed by the electronic apparatus 1100. The memory 1110 may include random access memory (RAM) such as dynamic random access memory (DRAM) and static random access memory (SRAM), read-only memory (ROM), electrically erasable programmable read-only memory (EEPROM), CD-ROM, Blu-ray or other optical disc storage, hard disk drive (HDD), solid state drive (SSD), and flash memory.

The processor 1120 may control overall operations of the electronic apparatus 1100 and process data and signals. The processor 1120 may overall control the electronic apparatus 1100 by executing at least one instruction or at least one program stored in the memory 1110. The processor 1120 may be implemented as a central processing unit (CPU), a graphics processing unit (GPU), or an application processor (AP), but not limited thereto.

The processor 1120 may select one of a plurality of algorithms as a first algorithm based on at least one of: a number of items; a number of discount coupons; and a sum of the number of items and the number of discount coupons. Here, the plurality of algorithms may include at least one of a heuristic algorithm and an optimal algorithm. According to an embodiment, the processor 1120 may select one of the heuristic algorithm and the optimal algorithm as the first algorithm according to whether at least two of the following conditions are satisfied: a first condition associated with the number of items; a second condition associated with the number of discount coupons; and a third condition associated with a sum of the number of the discount coupons and the number of the items. Here, the first condition may be whether the number of items included in a shopping cart exceeds a first threshold, and the second condition may be whether the number of discount coupons included in a shopping cart exceeds a second threshold. In addition, the third condition may be whether a sum of the number of items and the number of discount coupons in a shopping cart exceeds a third threshold, and when at least two of the three conditions are satisfied, the heuristic algorithm may be selected as the first algorithm.

The processor 1120 according to an embodiment may calculate, based on information on each of the discount coupons, a plurality of sub-combinations by matching each of the discount coupons with an item subject to a corresponding discount coupon, calculate a sub-combination having a largest number of elements among the plurality of sub-combinations as a first sub-combination, and select a heuristic algorithm as a first algorithm when a number of elements in the first sub-combination exceeds a fourth threshold. Specifically, when the number of elements in the first sub-combination exceeds the fourth threshold, the processor 1120 may select the heuristic algorithm as the first algorithm.

Meanwhile, the heuristic algorithm may be an algorithm that determines priorities of discount coupons based on attribute information of the discount coupons and determines information associated with information regarding a set of each of the discount coupons and an item subject to a corresponding discount coupon, starting with a first discount coupon with a highest priority based on selection of an item which is to be most discounted when the first discount coupon is used. In this case, the attribute information of the discount coupons may include at least one of a discount type, a discount rate, and the maximum discount amount, and the discount type may include one of a flat rate discount type and a flat amount discount type.

In addition, a discount coupon of the flat rate discount type may have a higher priority than that of a discount coupon of the flat amount discount type, a discount coupon with a higher flat discount rate may have a higher priority among discount coupons of the flat rate discount type, and a discount coupon with a larger flat discount amount may have a higher priority among discount coupons of the flat amount discount type.

Meanwhile, the optimal algorithm may be an algorithm that determines a combination of an item and a discount coupon with a maximum discount amount in total with respect to all combinations of discount coupons and items.

Since the operation is performed on all combinations of discount coupons and items, if a sum n of numbers of discount coupons and items increases, computational complexity $2^n$ also increases and a delay time may increase as well. Meanwhile, in a case where there is a plurality of combinations of discount coupons and items, the optimal algorithm may be equivalent to performing in parallel operations of determining a set of each of the discount coupons and an item subject to a corresponding discount coupon with respect to the plurality of combinations.

In a case where the optimal algorithm is selected as the first algorithm, when a run time exceeds a first time threshold, the processor 1120 may identify a discount coupon to be applied to the item using the heuristic algorithm.

The processor 1120 may determine a set of each of the discount coupons and an item subject to a corresponding discount coupon using the selected first algorithm. In addition, when there is a plurality of combinations of discount coupons and items, the processor 1120 according to an embodiment may simultaneously perform operations of determining a discount coupon to be recommended with respect to the plurality of combinations. For example, it is possible to reduce a delay time by simultaneously performing an operation of calculating a discount amount for a combination {D1, I1, I2, I3} including a first coupon and first to third items and an operation of calculating a discount amount for a combination {D2, I4, I5, I6} including a second coupon and fourth to six items. The above-described example is an example of calculating a discount amount of each combination, but the operation of determining a discount coupon to be recommended is not limited thereto.

The processor 1120 according to an embodiment may determine a set having a largest number of elements among a set of each of the discount coupons and an item subject to a corresponding discount coupon as a first set, reselect the first algorithm based on the number of elements in the first set, and determine a set of each updated discount coupon and an item subject to a corresponding updated discount coupon using the set of each of the discount coupons and an item subject to a corresponding discount coupon and the reselected first algorithm. In this case, information on the item may be determined based on the set of each updated discount coupon and an item subject to a corresponding updated discount coupon.

If the plurality of algorithms includes at least one of the heuristic algorithm and the optimal algorithm and the heuristic algorithm has been selected as the first algorithm, reselecting the first algorithm by the processor 1120 may be reselecting the optimal algorithm as the first algorithm when the number of elements in the first set is less than or equal to a fifth threshold.

Meanwhile, the set of each of the discount coupons and an item subject to a corresponding discount coupon may be calculated based on at least one of: information on the item and information on the corresponding discount coupon. In addition, the information on the item may include at least one of: ID of the item, a category to which the item belongs, and a price of the item, and the information on the corresponding discount coupon may include at least one of attribute information of the corresponding discount coupon, an allowed user ranking, and an available payment method.

In addition, in the case where only one discount coupon can be used for one shopping cart in the online store and when items and discount coupons are included in a first shopping cart, the processor 1120 may classify items recommended for use of the same discount coupon based on the information regarding the set of each of the discount coupons and an item subject to a corresponding discount coupon and may divide the first shopping cart into a plurality of shopping cart based on the classification.

Also, the processor 1120 may display discount coupon-associated information on at least one of a shopping cart page and a final payment page of the online store.

The electronic device or the terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method for providing information regarding a discount coupon to be applied to an item, the method performed by an electronic apparatus comprising a memory and a hardware processor, the method comprising:
   identifying a user device accessing an online store operated by the electronic apparatus;
   obtaining, from the user device, information associated with an item purchase from the online store;
   selecting, via the hardware processor, a first algorithm from one of a heuristic algorithm and an optimal algorithm based on at least one of: a number of items, a number of discount coupons, or a sum of the number of the items and the number of the discount coupons, wherein the heuristic algorithm is configured to determine a priority of each of the discount coupons based on: i) attribute information of each of the discount coupons and ii) applying the discount coupons in order of priority based on a selection of one of the items which is to be most discounted when the corresponding discount coupon is used, wherein the optimal algorithm is configured to determine a combination of the items and the discount coupons with a maximum discount with respect to all combinations of the items and the discount coupons;

determining, using the first algorithm executed on the hardware processor, a set of each of the discount coupons and an item subject to each of the discount coupons; and transmitting, to the user device, discount coupon-associated information based on the information associated with the item purchase and information regarding the set of each of the discount coupons and the item subject to each of the discount coupons, wherein the selecting of the first algorithm comprises selecting the heuristic algorithm as the first algorithm when at least two of following conditions are satisfied: a first condition in which the number of the items exceeds a first threshold number of items related to the selecting of the first algorithm; a second condition in which the number of the discount coupons exceeds a second threshold number of discount coupons related to the selecting of the first algorithm; and a third condition in which the sum of the number of the discount coupons and the number of the items exceeds a third threshold related to the selecting of the first algorithm, and wherein the method further comprises, in a case where the optimal algorithm is selected as the first algorithm, identifying, using the heuristic algorithm, a discount coupon to be applied to the item when a run time for the optimal algorithm exceeds a first time threshold.

2. The method of claim 1, further comprising:
determining a set having a largest number of included items among the set of each of the discount coupons and the item subject to each of the discount coupons as a first set;
reselecting the first algorithm based on a number of included items in the first set; and
determining, using the reselected first algorithm and the set of each of the discount coupons and the item subject to each of the discount coupons, a set of each of updated discount coupons and an item subject to each of the updated discount coupons,
wherein information associated with the item is determined based on the set of each of the updated discount coupons and the item subject to each of the updated discount coupons.

3. The method of claim 2,
wherein after the heuristic algorithm is selected as the first algorithm, the reselecting of the first algorithm comprises reselecting the optimal algorithm as the first algorithm when the number of the included items in the first set is less than or equal to a fifth threshold number of items related to the selecting of the first algorithm.

4. The method of claim 1,
wherein the selecting of the first algorithm comprises:
calculating, based on information regarding each of the discount coupons, a plurality of sub-combinations by matching each of the discount coupons and the item subject to each of the discount coupons;
determining a sub-combination having a largest number of included items among the plurality of sub-combinations as a first sub-combination; and
selecting the heuristic algorithm as the first algorithm when a number of elements in the first sub-combination exceeds a fourth threshold number of items related to the selecting of the first algorithm.

5. The method of claim 1,
wherein the set of each of the discount coupons and the item subject to each of the discount coupons are determined based on information regarding the item and information regarding each of the discount coupons,
wherein the information regarding the item subject to each of the discount coupons comprises at least one of: identification information of the item, a category of the item, or a price of the item, and
wherein the information regarding each of the discount coupons comprises at least one of: attribute information of each of the discount coupons a user ranking corresponding to each of the discount coupons, or a payment method corresponding to each of the discount coupons.

6. The method of claim 5,
wherein the attribute information of each of the discount coupons comprises at least one of: a discount type, a discount rate, or a maximum discount amount, and the discount type comprises one of: a flat rate discount type or a flat amount discount type.

7. The method of claim 1,
wherein a discount coupon of a flat rate discount type has a priority higher than a priority of a discount coupon of a flat amount discount type,
wherein a discount coupon of the flat rate discount type with a greater discount rate than an additional discount coupon of the flat rate discount type has a higher priority than the additional discount coupon, and
wherein a discount coupon of the flat amount discount type with a greater discount amount than an additional discount coupon of the flat amount discount type has a higher priority than the additional discount coupons.

8. The method of claim 1, further comprising:
when only one discount coupon is allowed to be used in one shopping cart in an online store and each of the discount coupons and the item subject to each of the discount coupons are included in a first shopping cart:
classifying items recommended for use of a same discount coupon based on the information regarding each of the discount coupons and the item subject to each of the discount coupons; and
dividing the first shopping cart into a plurality of shopping carts based on the classifying of the items recommended for use of the same discount coupon.

9. The method of claim 1,
wherein when there is a plurality of combinations of the discount coupons and the items, operations for determining the set of each of the discount coupons and the item subject to each of the discount coupons are performed in parallel with respect to the plurality of combinations.

10. The method of claim 1,
wherein the discount coupon-associated information is displayed on at least one of a shopping cart page and a final payment page of the online store.

11. A non-transitory recording medium having recorded thereon a program, which, when executed by a computer, implements the method of claim 1.

12. An electronic apparatus for providing information regarding a discount coupon to be applied to an item, the apparatus comprising:

a memory configured to store at least one instruction; and a processor configured to execute the at least one instruction to:

identify a user device accessing an online store operated by the electronic apparatus;

obtain, from the user device, information associated with an item purchase from the online store;

select a first algorithm from one of a heuristic algorithm and an optimal algorithm based on at least one of: a number of items, a number of discount coupons, or a sum of the number of the items and the number of the discount coupons, wherein the heuristic algorithm is configured to determine a priority of each of the discount coupons based on: i) attribute information of each of the discount coupons and ii) applying the discount coupons in order of priority based on a selection of one of the items which is to be most discounted when the corresponding discount coupon is used, wherein the optimal algorithm is configured to determine a combination of the items and the discount coupons with a maximum discount with respect to all combinations of the items and the discount coupons;

determine, using the first algorithm, a set of each of the discount coupons and an item subject to each of the discount coupons; and transmit, to the user device, discount coupon-associated information based on the information associated with the item purchase and information regarding the set of each of the discount coupons and the item subject to each of the discount coupons, wherein the selecting of the first algorithm comprises selecting the heuristic algorithm as the first algorithm when at least two of following conditions are satisfied: a first condition in which the number of the items exceeds a first threshold number of items related to the selecting of the first algorithm; a second condition in which the number of the discount coupons exceeds a second threshold number of discount coupons related to the selecting of the first algorithm; and a third condition in which the sum of the number of the discount coupons and the number of the items exceeds a third threshold related to the selecting of the first algorithm, and wherein in a case where the optimal algorithm is selected as the first algorithm, the processor further configured to identify, using the heuristic algorithm, a discount coupon to be applied to the item when a run time for the optimal algorithm exceeds a first time threshold.

* * * * *